UNITED STATES PATENT OFFICE.

FRITZ KRÜGER, OF FÜRSTENBERG, ASSIGNOR TO THE LEIPZIGER ANILIN FABRIK, BEYER & KEGEL, OF LINDENAU, GERMANY.

PRODUCTION OF BETANAPHTHOL-DISULPHO ACIDS.

SPECIFICATION forming part of Letters Patent No. 351,056, dated October 19, 1886.

Application filed May 26, 1884. Serial No. 132,839. (Specimens.) Patented in Germany April 19, 1884, No. 33,916, and in England May 1, 1884, No. 7,097.

*To all whom it may concern:*

Be it known that I, FRITZ KRÜGER, a citizen of Germany, residing at Fürstenberg, in the Empire of Germany, have invented a new and Improved Process for Producing Betanaphthol-Disulpho Acid Separately and Obtaining Coloring-Matters therefrom, of which the following is a specification.

Four (4) parts of sulphuric acid of 66° Baumé are heated to 125° to 135° centigrade, thereupon one (1) part of betanaphthol quickly introduced and the temperature maintained at 125° to 145° centigrade during four to five hours. The product is dissolved in the triple weight of water, half the weight of the employed sulphuric acid of soda-ash added, and the solution saturated with common salt. In growing cold there crystallizes from the solution the acid salts of those sulpho-acids which give with diazo compounds the redder colors, while there remain in the solution those salts which give more yellow shades. The whole is then filtered and washed with a concentrated solution of common salt until the filtrate ceases to show a fluorescence. The residue and the filtrate may now be directly employed for the production of colors. Instead of the acid salts, the neutral salts may also be produced by the complete saturation of the sulphuric acid with soda, and thereupon the separation effected with common salt. Besides, the acid soda-salts may of course be made by common salt alone, or by sulphate of soda or caustic soda. The residue obtained from the acid as well as from the neutral salts is partly soluble still in spirit; but the coloring-matters derived from that part which is soluble in spirit are not essentially different from those derived from the part which is not soluble.

In order to produce the coloring-matters from the salts of the thus-obtained separated betanaphthol-disulpho acids, the quantity of them in the residue, as well as in the filtrate, is previously determined by an experiment. Then the acid salts are converted into the neutral salts by complete saturation with soda, the solution made alkaline with ammonia or milk of lime, and converted in the usual way into coloring-matters by a diazo compound. I obtain in this way from the part of the salts which is not soluble in salt-water, by combination with alphadiazonaphthaline, a bluish bordeaux; diazocumol, bluish scarlet; diazoxylol, reddish scarlet; diazotoluol, yellowish scarlet; diazobenzol, reddish orange; alphadiazonapthaline-sulpho acid, bordeaux; and betadiazonaphthaline-sulpho acid, scarlet; from the part which is soluble in salt-water with alphadiazonaphthaline, bluish bordeaux; diazocumol, reddish ponceau; diazoxylol, yellowish ponceau; diazotoluol, reddish orange; diazobenzol, yellowish orange; and alphadiazonaphthaline-sulpho acid, bluish bordeaux.

What I claim as my invention, and desire to secure by Letters Patent, is—

The process of producing betanaphthol-disulpho acid, which consists in heating the concentrated sulphuric acid above the melting-point of the betanaphthol and maintaining the temperature after inserting the betanaphthol at 125° to 145° centigrade during four to five hours, and of separating the thus-obtained betanaphthol-disulpho acid by treating its acid or neutral soda or lime salts in aqueous solution with common salt, substantially as described.

In testimony whereof I have signed my name to this specification in the presence of two subscribing witnesses.

FRITZ KRÜGER.

Witnesses:
   JOHN R. ROSLYN,
   B. ROI.